United States Patent
McMillen

(10) Patent No.: US 9,802,829 B2
(45) Date of Patent: Oct. 31, 2017

(54) METHODS OF MAKING TITANIUM DIBORIDE POWDERS

(71) Applicant: ALCOA USA CORP, Pittsburgh, PA (US)

(72) Inventor: James C. McMillen, Pittsburgh, PA (US)

(73) Assignee: Alcoa USA Corp., Pittsburgh, PA (US)

( * ) Notice: Subject to any disclaimer, the term of this patent is extended or adjusted under 35 U.S.C. 154(b) by 0 days.

(21) Appl. No.: 15/297,997

(22) Filed: Oct. 19, 2016

(65) Prior Publication Data

US 2017/0036919 A1 Feb. 9, 2017

Related U.S. Application Data

(63) Continuation of application No. 13/887,732, filed on May 6, 2013, now abandoned, which is a continuation of application No. 13/489,634, filed on Jun. 6, 2012, now abandoned, which is a continuation of application No. 12/916,437, filed on Oct. 29, 2010, now Pat. No. 8,216,536.

(60) Provisional application No. 61/256,620, filed on Oct. 30, 2009.

(51) Int. Cl.
    *C01B 35/04* (2006.01)

(52) U.S. Cl.
    CPC .......... *C01B 35/04* (2013.01); *C01P 2004/03* (2013.01); *C01P 2004/51* (2013.01); *C01P 2004/61* (2013.01); *C01P 2006/12* (2013.01)

(58) Field of Classification Search
    CPC ............................ C01B 35/04; C01P 2004/61
    See application file for complete search history.

(56) References Cited

U.S. PATENT DOCUMENTS

| | | | | |
|---|---|---|---|---|
| 3,258,316 A | * | 6/1966 | Tepper | C01B 35/04 423/250 |
| 5,110,565 A | * | 5/1992 | Weimer | B01J 8/0095 422/145 |

(Continued)

FOREIGN PATENT DOCUMENTS

| | | | | |
|---|---|---|---|---|
| CN | 1036003 A | | 10/1989 | |
| DE | EP 2423164 A1 | * | 2/2012 | C01B 35/04 |

OTHER PUBLICATIONS

Kim et al (Synthesis of Nano-Titanium Diboride Powders by Carbothermal Reduction; Journal of the European Ceramic Society; pp. 715-718; 27; 2007).*

*Primary Examiner* — Jun Li
(74) *Attorney, Agent, or Firm* — Greenberg Traurig, LLP

(57) ABSTRACT

The present disclosure is directed towards methods of making titanium diboride products in various sizes. An aspect of the method provides (a) selecting a target average particle size for a target titanium diboride product; (b) selecting at least one processing variable from the group consisting of: an amount of sulfur, an inert gas flow rate, a soak time, and a reaction temperature; (c) selecting a condition of the processing variable based upon the target average particle size; and (d) producing an actual titanium diboride product having an actual average particle size using the at least one processing variable, wherein due to the at least one processing variable, the actual average particle size corresponds to the target average particle size.

18 Claims, 17 Drawing Sheets

(56) References Cited

U.S. PATENT DOCUMENTS 5,160,716 A * 11/1992 Logan .................... C01B 35/04
  423/297
8,216,536 B2 * 7/2012 McMillen ............... C01B 35/04
  423/297

* cited by examiner

4% S in C at 1L/min          4% S in C at 4L/min 0.5 Hrs @1475°C 0.5 Hrs @1500°C 0.5 Hrs @1600°C 4.0 Hrs @1475°C 4.0 Hrs @1500°C 4.0 Hrs @1600°C 0.25 L/min 3.0 L/min 0.25 L/min Ar 3.0 L/min Ar

METHODS OF MAKING TITANIUM DIBORIDE POWDERS

CROSS-REFERENCE TO RELATED APPLICATIONS

This patent application is a continuation of and claims priority to U.S. patent application Ser. No. 13/887,732 filed May 6, 2013 which is a continuation of U.S. patent application Ser. No. 13/489,634 filed Jun. 6, 2012, which is a continuation of U.S. patent application Ser. No. 12/916,437 filed Oct. 29, 2010, now U.S. Pat. No. 8,216,536 issued Jul. 10, 2012, which is a non-provisional of U.S. Provisional Application No. 61/256,620, filed Oct. 30, 2009, all of which are incorporated herein by reference in their entirety.

This application is claims priority to U.S. Application Ser. No. 61/256,520, entitled "Synthesis of Titanium Diboride Powders" filed on Oct. 30, 2009, which is incorporated by reference in its entirety.

BACKGROUND

In the production of aluminum and other metals, materials that withstand extreme conditions (i.e. high temperatures and/or corrosive environments) are used for various electrolysis cell components. An example of one such material is titanium diboride.

SUMMARY OF THE INVENTION

Titanium diboride ($TiB_2$) has unique mechanical, physical, and chemical properties which make it a desirable material for various applications, including for example, electrolysis cell components. The particle size of the titanium diboride affects processing parameters, including: sinterability and formability into $TiB_2$-based products, and thus, the titanium diboride particle size affects the performance of $TiB_2$ products.

Broadly, the present invention is directed to synthesizing titanium diboride with a specific particle size (e.g. average particle size). The present inventor has discovered that by controlling one or more processing variables; the resulting particle size of the titanium diboride product is also controlled. Thus, the particle size of the titanium diboride product may be directed by varying the amount of sulfur in the chemical reaction of titanium diboride (e.g. carbothermic reaction); by varying the soak time of the precursor mixture; by varying the reaction temperature, and/or by varying the flow rate of an inert gas through the reactor. One of more of these factors may be varied individually, or in combination, in order to effectively produce a titanium diboride product having a specified average particle size (or average particle diameter when a spherical/circular particle). Other parameters, including purity and/or surface area may also be controlled with one or more of these variables. Thus, the titanium diboride made in accordance with the present disclosure may be used in various applications which may require different average particle sizes and/or purity of the titanium diboride. In some embodiments, the titanium diboride products of the present disclosure may be used in electrolysis cell components and/or electrodes, including, for example, cathodes.

In one aspect of the instant disclosure, a method is provided. The method includes the steps of: (a) selecting a target average particle size for a target titanium diboride product; (b) selecting at least one processing variable from the group consisting of: an amount of sulfur, an inert gas flow rate (e.g. reaction environment), a soak time, and a reaction temperature; (c) selecting a condition of the processing variable based upon the target average particle size; and (d) producing an actual titanium diboride product having an actual average particle size using the at least one processing variable, wherein due to the at least one processing variable, the actual average particle size corresponds to the target average particle size.

In one embodiment, the at least one processing variable is the amount of sulfur; and the condition of the amount of sulfur is not greater than about 1.0 wt. %. In this embodiment, the actual average titanium diboride particle size is not greater than about 7 microns.

In one embodiment, the at least one processing variable is the reaction temperature; wherein when the condition of the reaction temperature is in the range of at least about 1450° C. to 1500° C., the actual average titanium diboride particle size is in the range from about 4 microns to about 7 microns.

In one embodiment, the at least one processing variable is the soak time; wherein when the condition of the soak time is in the range of about 0.5 hrs to about 1 hour, the actual average titanium diboride particle size is in the range of about 4.5 microns to about 8 microns.

In one embodiment, the at least one processing variable includes the inert gas flow rate and the amount of sulfur. In this embodiment, when the condition of the amount of sulfur is in the amount of not greater than about 1 wt. %; and when the condition of the inert gas flow rate is in the range of at least about 0.5 liters per minute; the actual average titanium diboride particle size not greater than about 6.5 microns.

In another aspect of the present invention, a method is provided. The method includes: (a) selecting a target average particle size for a target titanium diboride product; (b) selecting an amount of sulfur based upon the target average particle size; and (c) producing an actual titanium diboride product having an actual average particle size, wherein, due to the amount of sulfur, the actual average particle size corresponds to the target average particle size.

In one embodiment, when the amount of sulfur is not greater than about 1.0 wt. %, the actual average titanium diboride particle size is not greater than about 7 microns.

In some embodiments, the method includes selecting at least one processing variable. For example, the processing variable may be one or more of: an inert gas flow rate, a soak time, and a reaction temperature; and others. For example, when at least one processing variable is selected, the condition of the processing variable is based on one or both of: (a) the target average particle size (e.g. pre-determined titanium diboride particle size range); and/or the amount of sulfur (e.g. pre-determined amount of sulfur, e.g. selected in advance).

In one embodiment, one or more of the methods may include the step of deagglomerating the actual titanium diboride product to remove a plurality of agglomerations in the titanium diboride product. A non-limiting example of deagglomerating includes milling. In some embodiments, the milling of the titanium diboride product is for a length of time based upon the amount of sulfur in the precursor mixture. In other embodiments, the milling time may be based upon whether other processing variables are selected (e.g. flow rate of inert gas, soak time, and/or reaction temperature).

In some embodiments, the method includes preparing an agglomerated mixture (e.g. precursor mixture) including: mixing into a liquid the boron source; the carbon source (e.g. carbon component); the titanium source, and optional additives to form a suspension; and drying the suspension to produce the agglomerated mixture. For example, drying may include spray drying.

In another aspect of the present invention, a method is provided. The method includes the steps of: (a) selecting a target average particle size for a target titanium diboride product; (b) selecting an amount of sulfur based upon the target average particle size; (c) producing an actual titanium diboride product having an actual average particle size, wherein, due to the amount of sulfur, the actual average particle size corresponds to the target average particle size; wherein the producing comprises: reacting a precursor mixture in a reactor, the precursor mixture including: a titanium source; a boron source; a carbon source; and the amount of sulfur.

In some embodiments, after the producing step, the method includes: processing the actual titanium diboride product into one of: a cathode; a structure of an aluminum electrolysis cell; and combinations thereof.

In another aspect of the instant disclosure, an electrode (e.g. a cathode) is provided. The cathode includes a titanium diboride powder product, wherein the product is formed from an average particle size titanium diboride of not greater than about 6 microns. For example, the titanium diboride product may be produced by one or more of the methods disclosed herein. In some embodiments, the cathode formed from titanium diboride has properties including: electrical conductivity; hardness, strength, elastic modulus, resistance to mechanical erosion; abrasion resistance, ease in processing (e.g. lower temperature and pressure due to lower particle size)

As used herein, "titanium diboride" refers to a compound of the chemical formula $TiB_2$. In one embodiment, titanium diboride is a ceramic material in the form of a particle. As used herein, "titanium diboride product" refers to a titanium diboride particles. In one embodiment, the titanium diboride product refers to the final product of reacting step.

As used herein, "selecting" refers to choosing one or more criteria. In some embodiments, selecting may take into account desirable chemical, material, or physical properties of the titanium diboride product. For example, some selected properties may include particle size, surface area, purity, and morphology (e.g., shape). In some embodiments, selecting may be done in advance.

As used herein, "processing variable" refers to a parameter that can be varied or changed. For example, there are multiple processing variables that can be modified or controlled in accordance with one or more methods of the instant disclosure. Some non-limiting examples of processing variables include: the amount of sulfur, the flow rate of inert gas (through the reactor), the reaction temperature, and the soak time, to name a few.

In some embodiments, one or more processing variables may be varied or changed in order to produce titanium diboride particles having the target average particle size.

In four separate embodiments, the processing variables include, individually, an amount of sulfur, the flow rate of inert gas (through the reactor), the reaction temperature, and the soak time ("dwell time"). In one embodiment, the processing variables include an amount of sulfur, the flow rate of inert gas (through the reactor), the reaction temperature, and the soak time ("dwell time"). In another embodiment, the processing variables include an amount of sulfur, the flow rate of inert gas, and the reaction temperature. In another embodiment, the processing variables include an amount of sulfur and the flow rate of inert gas. In another embodiment, the processing variables include the flow rate of inert gas, the reaction temperature, and the soak time. In another embodiment, the processing variables include the flow rate of inert gas and the soak time. In another embodiment, the processing variables include the reaction temperature and the soak time.

As used herein, "condition" refers to a particular restriction or limitation. In some embodiments, the condition refers to an amount or quantity. Non-limiting examples include: time (in hrs), amounts (in wt. % or masses), heat (measured in temperature), and/or rates (flow rates, rates of reaction(s)). In some embodiments, a condition can refer to the existence of a condition (e.g. sulfur vs, no sulfur, argon purge vs. closed reaction vessel).

As used herein, "target" refers to a goal. As a non-limiting example, the target may refer to the average particle size of the titanium diboride product that is the goal of the method. There may be more than one target value, as various target particle sizes of titanium diboride have applications in various applications and technologies.

As used herein, "particle" refers to a unit of something (e.g. a single piece). One example of a particle is a titanium diboride particle of the $TiB_2$ product.

As used herein, "particle size" refers to the effective length of a particle (for example, the length of a titanium diboride particle). Sometimes "grain", "crystal", and/or "crystallite" may be used interchangeably herein to refer to a "particle." Likewise, in some instances, the "particle size" may also be referred to as the 'grain size' or the 'crystal size'. The particle size of a quantity of particles (e.g., titanium diboride product) may be approximated by averaging a value for the quantity. Non-limiting examples of average particle size measurements include: (1) "particle size distribution" (referred to as "PSD") and (2) surface area ($m^2/g$).

As used herein, "particle size distribution" refers to the relative amounts of particles present, sorted according to the number of sizes present. For example, a PSD D10 of 7 microns means that 10% of the particles are smaller than about 7 microns while 90% of the particles are equal to or greater than about 7 microns. As another example, a PSD D50 of 12 microns means that half of the particles are smaller than about 12 microns while the other half are equal to or greater than about 12 microns, and PSD D90 of 20 microns means that 90% of the particles are smaller than about 20 microns while 10% of the particles are equal to or greater than about 20 microns. Generally, in referencing the same material, the particle size distributions of D10 to D90 will be ascending (i.e. D90 values are larger than both D50 and D10 values, while D50 values are larger than D10 values). Although D10, D50, and D90 are referenced herein, it is readily recognized that in measuring the titanium diboride particle size, the PSD may be any PSD that is useful, and is not limited to D10, D50, and D90 values.

As used herein, "surface area" refers to the amount of exposed area a solid object has, expressed in square units. Surface area is measured in units of $m^2/g$. Generally, the larger the surface area, the smaller the individual particles of the sample being measured.

In some embodiments, the selected and/or actual titanium diboride particle size may have a narrow range or a wide range. In some embodiments, the particle size distribution (e.g. average particle size distribution) may have more than one mode (bimodal, trimodal, etc). In some embodiments, the titanium diboride particle size is in the range of from about 0.1 micron to about 0.5 microns, about 0.5 microns to about 1.5 microns, or from about 1.5 microns to about 4.5 microns, or from about 4.5 microns to about 6.5 microns, or from about 6.5 microns to about 9 microns, or from about 9 microns to about 12 microns, or from about 12 microns to about 15.0 microns, or from about 15 microns to about 18 microns, or from about 18 microns to about 20 microns. In one embodiment, the particle size distribution is in the range of about 0.5 microns to about 4 microns, or from about 4 microns to about 8 microns, or from about 8 microns to about 12 microns, or from about 12 microns to about 20 microns. In some embodiments, the particle size distribution is in the range of from about 20 microns to about 30 microns, or from about 30 microns to about 40 microns, or from about 40 microns to about 50 microns, for from about 50 microns to about 60 microns or from about 60 microns to about 70 microns or from about 70 microns to about 80 microns, or higher, as may be desired. In one embodiment, the titanium diboride particle size is in the range of from about 0.1 micron to about 20 microns. In some embodiments, the titanium diboride particle size is less than about one micron. In other embodiments, the titanium diboride particle size is not greater than about 20 microns, or not greater than about 30 microns, or not greater than about 40 microns, or not greater than about 50 microns or not greater than about 60 microns, or not greater than about 70 microns, or not greater than about 80 microns.

As used herein, "sulfur" means a sulfur-containing material (e.g., element(s) and/or compound(s) containing or including sulfur). Non-limiting examples of sulfur-containing material include elemental sulfur, iron sulfide, zinc sulfide, copper sulfide, nickel sulfide, iron sulfate, zinc sulfate, copper sulfate, nickel sulfate, copper iron sulfide, and copper iron sulfate, among other sulfur-containing compound additives, metal sulfides and metal sulfates. In some embodiments, the sulfur-containing material may be included in the carbothermal reaction as an additional precursor or additive.

As used herein, "amount of sulfur" refers to a quantity of sulfur, for example, a weight percent of sulfur. Non-limiting examples include: the weight percent or alternatively volume percent of sulfur present in the precursor mixture. In some embodiments, sulfur exists as an impurity in one or more reagents of the precursor mixture. As non-limiting examples, certain carbon sources, catalysts, and/or other materials contain sulfur, and thus, contribute to the amount of sulfur in the precursor mixture. In other embodiments, sulfur may be an additive that is added to the precursor mixture.

In another aspect of the instant disclosure, an electrode (e.g. a cathode) is provided. The cathode includes a titanium diboride powder product, wherein the product is formed from an average particle size titanium diboride of not greater than about 6 microns. In some embodiments, the cathode formed from titanium diboride has properties including: electrical conductivity; hardness, strength, elastic modulus, resistance to mechanical erosion; abrasion resistance, ease in processing (e.g. lower temperature and pressure due to lower particle size)

In some instances, the sulfur may be present in the carbon source as an impurity. For example, carbon black may contain about 1.3% sulfur, calcined petroleum coke may contain about 1.20% sulfur, and synthetic graphite may contain sulfur in the range of from about 0.0% to about 0.1%. In some embodiments, using a carbon source such as synthetic graphite with about 0.008 wt. % sulfur refers to a sulfur-free or no sulfur material. Thus, sulfur may be present in varying amounts in one or more of the components of the instant disclosure.

In some embodiments, there may be no sulfur present in the precursor mixture. In other embodiments, the amount of sulfur within precursor mixture (and/or in the carbon source) is at least about 0.1%, or at least about 0.2%, or at least about 0.3%, or at least about 0.4%, or at least about 0.5%, or at least about 0.6%, or at least about 0.7%, or at least about 0.8%, or at least about 0.9%, or at least about 1.0%, or at least about 2.0%, or at least about 4.0%, or at least about 6%, or at least about 8%, or at least about 10%, or at least about 15%. In other embodiments, the amount of sulfur within the precursor mixture may be not greater than about 0.1%, or not greater than about 0.2%, or not greater than about 0.3%, or not greater than about 0.4%, or not greater than about 0.5%, or not greater than about 0.6%, or not greater than about 0.7%, or not greater than about 0.8%, or not greater than about 0.9%, or not greater than about 1.0%, or not greater than about 2.0%, or not greater than about 4.0%, or not greater than 6%, or not greater than about 8%, or not greater than about 10%, or not greater than about 15%. In some instances, the sulfur content within the precursor mixture is in the range of from about 0.0% to about 0.1%, or from about 0.1% to about 0.2%, or from about 0.2% to about 0.5%, or from about 0.5% to about 0.8%, or from about 0.8% to about 1.0%, or from about 1.0% to about 2.0%, or from about 2.0% to about 4.0%, or from about 4% to about 6%, or from about 6% to about 8% or from about 8% to about 12%, or from about 12% to about 15%, and the like. In some embodiments, the source of sulfur, as well as the amount of sulfur may impact the final titanium diboride product. As a non-limiting example, when iron sulfide is used as the sulfur source, large clusters of titanium diboride and iron grains are produced (e.g., at least about 10 microns), with additional grain growth present in localized areas containing, for example, the iron metal from the iron sulfide.

As used herein, "producing" refers to the making of a material or product. As a non-limiting example, producing includes making a titanium diboride product (i.e. chemically producing). In some embodiments, producing titanium diboride is done in a reacting step.

As used herein, "reacting" refers to the chemical combination of one or more materials into another (e.g., to form a product). As a non-limiting example, reacting includes chemically reacting the precursor mixture at elevated temperature, pressure, or both. In one embodiment, reacting may refer to carbothermically reacting components to form a product.

As used herein, "carbothermal reaction" refers to a reaction that uses a combination of heat and carbon. As a non-limiting example, titanium dioxide and boric oxide may be reduced with carbon to produce titanium diboride and carbon monoxide. In another non-limiting example, titanium dioxide and boric acid may be reacted with carbon to produce titanium diboride, carbon monoxide, and water. Additional discussion of the carbothermic reaction and additional related reaction are provided in the Examples section that follows.

In some embodiments, the method further includes selecting a reaction temperature. As one non-limiting example, the reaction temperature is the temperature at which the producing step is completed (e.g. reacting to form $TiB_2$). In some embodiments, the reacting step further includes heating the precursor mixture. In some embodiments, the reaction temperature is: at least about 1300° C., at least about 1325° C., at least about 1350° C., at least about 1375° C., at least about 1400° C., at least about 1425° C., at least about 1450° C., at least about 1475° C., at least about 1500° C., at least about 1525° C., at least about 1575° C., at least about 1600° C., at least about 1625° C., at least about 1650° C., at least about 1675° C., at least about 1700° C., or higher. In other embodiments, the reaction temperature is: not greater than about 1300° C., not greater than about 1325° C., not greater than about 1350° C., not greater than about 1375° C., not greater than about 1400° C., not greater than about 1425° C., not greater than about 1450° C., not greater than about 1475° C., not greater than about 1500° C., not greater than about 1525° C., not greater than about 1575° C., not greater than about 1600° C., not greater than about 1625° C., not greater than about 1650° C., not greater than about 1675° C., not greater than about 1700° C., or lower. In some instances, the mixtures may be heated at a temperature in the range of from about 1350° C. to about 1375° C., or from about 1400° C. to about 1450° C., or from about 1450° C. to about 1500° C., or from about 1500° C. to about 1550° C., or from about 1550° C. to about 1600° C., or from about 1600° C. to about 1650° C., or from about 1650° C. to about 1700° C. In some embodiments, the method further includes selecting a soak time. As used herein, "soak time" (e.g. "dwell time"), refers to the time in which materials are allowed to sit in contact with one another at a specific temperature, for a period of time. For example, the soak time is the amount of time that the precursors (in the precursor mixture) are held at a specific temperature (or within a temperature range) and interact. In some embodiments, the soak time is selected, based upon at least one of: the target titanium diboride particle size and/or one or more processing variables.

Non-limiting examples of soak times are: at least about 10 seconds, at least about a minute, at least about 2 minutes, at least about 4 minutes, at least about 7 minutes, at least about 10 minutes, at least about 0.25 hour, at least about 0.5 hour, or at least about 1 hour, or at least about 2 hours, or at least about 3 hours, or at least about 4 hours, or at least about 6 hours, or at least about 8 hours, or at least about 10 hours. In other embodiments, the mixture may be heated for a period of not greater than about 10 seconds, not greater than about 1 minute, not greater than about 2 minutes, not greater than about 4 minutes, not greater than about 7 minutes, not greater than about 10 minutes, not greater than about 0.25 hour, not greater than about 0.5 hour, or not greater than about 1 hour, or not greater than about 2 hours, or not greater than about 4 hours, or not greater than about 6 hours, or not greater than about 8 hours, or not greater than about 10 hours. In some instances, the mixture may be heated for a period in the range of: from about 0.10 hour to about 0.5 hour or from about 0.5 hour to about 1 hour, or from about 1 hour to about 1.5 hours, or from about 1.5 hours to about 2 hours, or from about 2 hours to about 3 hours, or from about 3 hours to about 4 hours, or from about 4 hours to about 5 hours, or from about 5 hours to about 6 hours, or from about 6 hours to about 7 hours, or from about 8 hours to about 9 hours, or from about 9 hours to about 10 hours, or more.

As used herein, "precursor mixture" refers to the components or materials that are used to make another material or product.

As used herein, "corresponds" means to be in agreement and/or conformation with. As a non-limiting example, the actual titanium diboride product may have a particle size that corresponds to the target titanium diboride product particle size. In some embodiments, corresponds includes an actual average particle size that can be used in the same way with the same success and results as that predicted for the target average particle size. As non-limiting examples, an actual average titanium diboride particle size may be identical to the target, average particle size, within about 0.01 microns, or within about 0.05 microns, or within about 0.1 microns, or within about 0.25 microns, or within about 0.4 microns, or within about 0.5 microns, or within about 0.7 microns, or within about 0.8 microns, or within about 0.9 microns, or within about 1 microns, or within about 1.5 microns, or within about 2 microns, or within about 3 microns, or within about 4 microns, and the like. As non-limiting examples, the actual titanium diboride product may have a particle size that is within at least about 5% of the target titanium diboride product particle size, within at least about 10% of the target titanium diboride product particle size, within at least about 20% of the target titanium diboride product particle size, within at least about 50% of the target titanium diboride product particle size, within at least about 75% of the target titanium diboride product particle size, within at least about 100% of the target titanium diboride product particle size. As a non-limiting example, the PSD and/or the surface area of the actual $TiB_2$ particle size may completely overlap, or be within a finite percentage or range of the target.

As used herein, "titanium source" refers to the chemical reagent that provides the titanium to the final titanium diboride product. One example is, but is not limited to: titanium dioxide. As used herein, "boron source" refers to the chemical reagent that provides the boron to the final titanium diboride product. Non-limiting examples of boron sources include, but are not limited to: boron sources include boric oxide and/or boric acid. As used herein, "carbon source" refers to the chemical reagent that provides the carbon to the chemical reaction to drive the production of the final titanium diboride product. In some embodiments, carbon sources may be naturally occurring, synthetic, or combinations thereof. Non-limiting examples of carbon sources include, but are not limited to: carbon black, synthetic carbon, and calcined petroleum coke, to name a few.

In one embodiment, carbon black is used as the carbon source. Carbon black may be produced by petroleum oil cracking in reactors and separated from combustion gases. In some embodiments, the carbon black may provide fine particle size distributions.

In one embodiment, synthetic graphite is used as the carbon source. The synthetic graphite may be produced by high temperature processing of amorphous carbon components (e.g., coal tar pitch or petroleum coke) at graphitizing temperature range of from about 2000° C. to about 3000° C., whereby the high temperature is capable of producing carbon component with low impurities.

In one embodiment, calcined petroleum coke may be used as the carbon source. The calcined petroleum coke may be produced by polymerizing via heat treatment of petroleum-based feed stock (e.g., green coke), with further heat treatment for removing volatile compounds.

In some embodiments, the producing step includes, before the reacting step, preparing a precursor mixture (e.g. an agglomerated form of a combined precursor mixture). In some embodiments, the preparing step includes, for example, mixing into a liquid the boron source; the carbon source; the titanium source, and optional additives to form a suspension; and drying the suspension to produce the agglomerated mixture. In one embodiment, the drying includes spray drying.

As used herein, "agglomeration" refers to particles clumped or bonded together into clusters. For example, in the titanium diboride product, the particles may be agglomerated together into larger clumps or masses, where each clump has some sort of bond or contact between a plurality of particles. The agglomerated titanium diboride product may have small voids or spaces between individual grains in the clump or mass (e.g. between individual grains).

In some embodiments, the precursor mixture includes reagents and optional additives. As used herein, an "additive" refers to something that is added to alter or improve the general properties and/or qualities in a material. In some embodiments, an additive refers to materials used in conjunction with the precursor mixture to improve the purity, PSD, or surface area of the titanium diboride product. Non-limiting examples of additives include: catalysts, surfactants, and liquids that assist in driving the reaction towards completion and/or limiting undesirable side reactions. Liquids can use used as an additive to the precursor mixture to assist in solubilization, suspension, and/or mixing of one or more of the precursors. In some embodiments, liquids are reactive, while in other embodiments, liquids are non-reactive. Liquids may include organic or inorganic materials. Acidic, basic, or neutral liquids may be used. As non-limiting examples, water is one such liquid. In some embodiments, catalysts can be used to drive the reaction towards preferred intermediates and/or products. As non-limiting examples, suitable catalysts include, but are not limited to: transition metal oxides. In some embodiments, catalysts may include, but are not limited to: iron oxide, nickel oxide, chrome oxide, manganese oxide, cobalt oxide, vanadium oxide, and the like.

Non-limiting examples of mixing include: intimately mixed, thoroughly mixing, homogenously mixing, dispersingly mixing, and combinations thereof. Non-limiting examples of processes for mixing include: wet milling, spray drying, dry milling, dry agglomerating, wet agglomerating, roll compacting, and combinations thereof.

As used herein, "surfactant" refers to a material that promotes mixing. Surfactants may be used with or without other mixing additives (e.g., but not limited to, liquids) in order to promote dispersion of precursors and increase contact between one or more reagents. As a non-limiting example, a surfactant can be added to the precursor mixture to reduce the surface tension between the liquid, allowing it to penetrate the solids for dispersion and/or mixing.

In some embodiments, the method includes deagglomerating the actual titanium diboride product to remove a plurality of agglomerations in the titanium diboride product. For example, deagglomerating may include milling the titanium diboride product for a length of time based upon the amount of sulfur in the precursor mixture. As used herein, "de-agglomerating" refers to separating particles that are clumped or bonded together in an agglomeration. In some embodiments, de-agglomerating is completed by milling. Non-limiting examples of deagglomerating include, for example, commutation methods known in the art, milling, ultrasonics, jet milling, and combinations thereof.

As used herein, "milling" refers to a process that reduces the size of a material. For example, milling may be used in the titanium diboride product in order to remove agglomerations, while maintaining the titanium diboride particle sizes (e.g., break up clumps of particles while particles remain intact).

In some embodiments, the method includes a directing an inert gas step through the reactor at a flow rate. For example, the flow rate may be selected, and based upon at least one of: the target average particle size, one or more processing variables (i.e. amount of sulfur, soak time, reaction temperature), reactor volume/size, reactor set-up, and combinations thereof.

As used herein, "directing" refers to flowing an inert gas through the reactor (e.g. into and out of the reactor) in order to maintain ideal reacting conditions. A non-limiting example of directing is flowing an inert gas through the reactor at a flow rate of L/minute. The flow rate may be adjusted, for example, to accommodate various sized reactors and/or varying amounts of sulfur present in the precursor mix.

As used herein, "inert gas" refers to a non-reactive gas. As a non-limiting example, the inert gas may be a noble gas or other gas which prevents atmospheric reactions with chemical reagents. In one embodiment, inert gas covers the precursor mixture and prevents, reduces, and/or eliminates non-desirable side reactions. For example, the inert gas may remove non-desirable intermediate species or mineralizing components from the reactor to drive the production of a high purity titanium diboride product. Some examples of the inert gas include but are not limited to, for example: argon, helium, and neon.

In some embodiments, the flow rate of the inert atmosphere may be, but is not limited to: be at least about 0.25 liter per minute, or at least about 0.5 liter per minute, or at least about 1.0 liter per minute, or at least about 2.0 liters per minute, or at least about 3.0 liters per minute, or at least about 4.0 liters per minute, or at least about 5 liters per minute, or at least about 7 liters per minute, or at least about 10 liters per minute, or at least about 12 liters per minute, or at least about 15 liters per minute, or at least about 20 liters per minute. In other embodiments, the flow rate may be not greater than about 20 liters per minute, not greater than about 15 liters per minute; not greater than about 12 liters per minute; not greater than about 10 liters per minute, not greater than about 7 liters per minute, not greater than about 5.0 liters per minute, or not greater than about 3.5 liters per minute, or not greater than about 2.5 liters per minute, or not greater than about 1.5 liters per minute, or not greater than about 1.0 liter per minute, or not greater than about 0.5 liter per minute, or not greater than about 0.25 liter per minute. In some instances, the flow rate may be in the range of from about 0.25 liter per minute to about 0.5 liter per minute, or from about 0.5 liter per minute to about 1.0 liter per minute, or from about 1.0 liter per minute to about 2.0 liters per minute, or from about 2.0 liters per minute to about 4.0 liters per minute, or from about 4.0 liters per minute to about 8.0 liters per minute, or from about 8.0 liters per minute to about 12.0 liters per minute, or from about 12.0 liters per minute to about 20.0 liters per minute. In some instances, the flow rate may also be referred to as the purge rate. The inert gas flow rate may be varied based on the size of the reactor and the reactor set-up.

In some embodiments, for a large average crystallite size (e.g. average particle size), the processing variables may be modified as follows: increasing the amount of sulfur, increase the reaction time, increased the soak time, and/or lower flow rate of inert gas. In other embodiments, for a finer (e.g. smaller) average crystallite size (e.g. average particle size), a small amount of sulfur, a lower soak time, a lower temperature, and/or an increased flow rate may be used.

The method may include making titanium diboride particles. In some embodiments, titanium diboride particles that are small in size may be easy to process and require lower temperature and pressure for fabrication (e.g., converting into titanium diboride powder products and other titanium diboride material) than larger sized titanium diboride particles. In some embodiments, some titanium diboride materials with different particle sizes may produce titanium diboride products that have different chemical, physical and electrical properties including, for example: hardness, strength, elastic modulus, abrasion resistance, and conductivity, among others.

Referring to FIG. 1, a flow chart for an embodiment of a method 100 is depicted. The method includes the step of selecting 110 a target average particle size. In some embodiments, the target average particle size may be a particle size or range required for a particular application, including titanium diboride which is sinterable, hot pressable, or otherwise processable for electrolysis cell applications, including, for example, electrodes. Next, the method comprises selecting an amount of sulfur 120. In some embodiments, the amount of sulfur in the precursor mixture corresponds to the carbon source, as sulfur is present as an impurity in some carbon sources. In other embodiments, the amount of sulfur selected is directly added to the precursor mixture. In some embodiments, the amount of sulfur in the precursor mixture has been found to have a direct affect to the titanium diboride particle size. The method further comprises the step of producing an actual titanium diboride product. In some embodiments, selecting a target average particle size and selecting an amount of sulfur may be combined, for example, by determining a direct empirical relationship between the amount of sulfur, the resulting titanium diboride particle size, and/or other relevant reaction variables (e.g. inert gas flow rate, stoichiometry, catalyst(s), soak time, temperature, and/or product processing, to name a few).

Referring to FIG. 2, the steps are depicted as various additional steps are depicted as a subset of the producing step 130. In other embodiments, the methods described include one or more of these additional steps. Referring to FIG. 2, the producing step 130 further includes: mixing to form a suspension/slurry 140; drying the suspension to form a precursor mixture 150; soaking the precursor mixture 160; heating the precursor mixture at a temperature 170; and/or deagglomerating the titanium diboride product into individual particles of titanium diboride 180; and combinations thereof.

BRIEF DESCRIPTION OF THE DRAWINGS

FIG. 21A depicts a 0.25 L/min flow rate with low to no sulfur present in the carbon source (i.e. synthetic graphite). FIG. 21B depicts a 3.0 L/min flow rate with no to low sulfur present in the carbon source (i.e. synthetic graphite). FIG. 21C depicts a 0.25 L/min flow rate with sulfur present in the carbon source (i.e. carbon black). FIG. 21D depicts a 3.0 L/min flow rate with sulfur present in the carbon source (i.e. carbon black).

DETAILED DESCRIPTION

Figure 1:
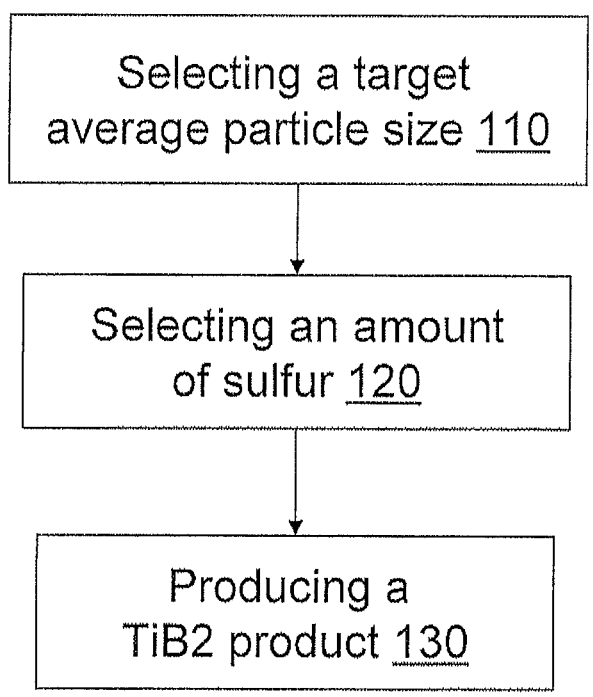
FIG. 1 is a flow chart depicting an embodiment of a method of the present disclosure.
Figure 2:
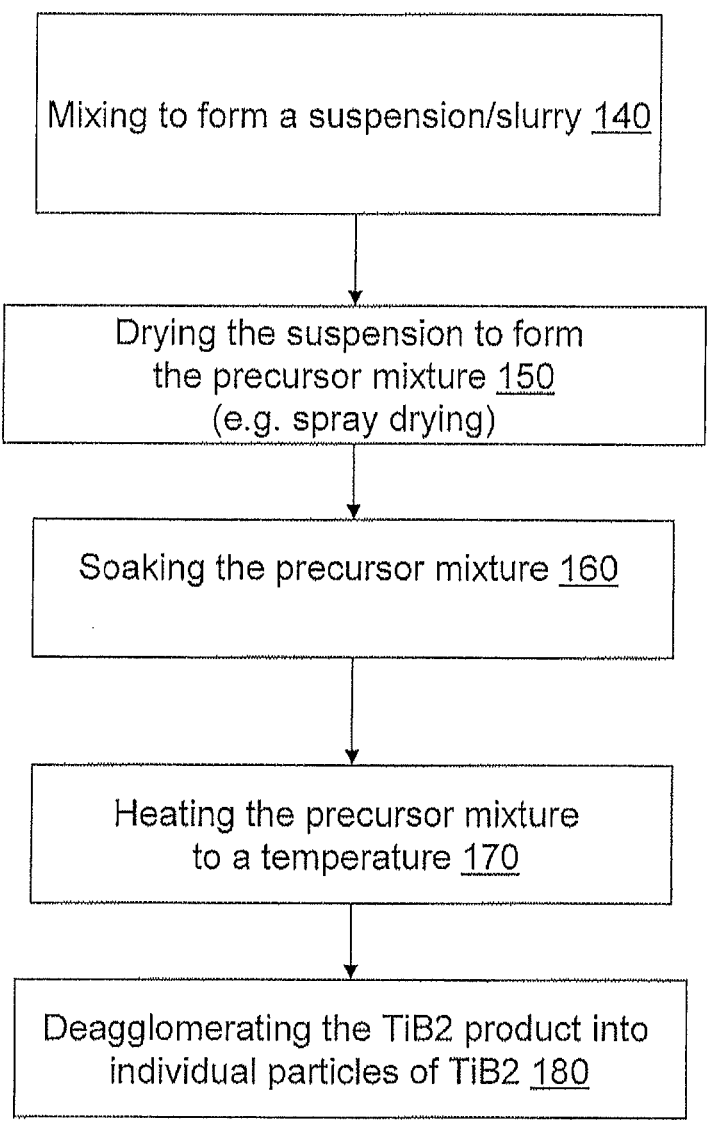
FIG. 2 is an embodiment of a process flow chart for the chemical production of titanium diboride.

Carbothermic Reduction and Related Reactions:

Carbothermic reduction is a solid state synthesis method to make $TiB_2$, which utilizes a carbon source to reduce boron and titanium oxides at temperatures in excess of 1350° C. (e.g. 1375° C. In some embodiments, titanium diboride particles may be prepared by carbothermal reduction of titanium dioxide, boric oxide and carbon in accordance with Equation (1).

$$TiO_2 + B_2O_3 + 5C \rightarrow TiB_2 + 5CO \qquad (1)$$

In one embodiment, titanium diboride particles can be produced by carbothermal reaction of titanium dioxide, boric acid, and carbon in accordance with Equation (2).

$$TiO_2 + 2H_3BO_3 + 5C \rightarrow TiB_2 + 5CO + 3H_2O \qquad (2)$$

In one embodiment, boric acid may be converted to boric oxide and water at higher temperatures in accordance with Equation (3).

$$2H_3BO_3 \rightarrow B_2O_3 + 3H_2O \qquad (3)$$

In some embodiments, varying amounts of titanium diboride particles may be produced depending on the amount of precursors and yield percentages. Some related chemical reactions that may occur in carbothermic reduction are as follows, referenced as Equation (4)-(7):

$$TiO_2 + 3C \rightarrow TiC + 2O \qquad (4)$$

$$TiC + B_2O_3 + 2C \rightarrow TiB_2 + 3CO \qquad (5)$$

$$B_2O_3 + 3C \rightarrow 2B + 3CO \qquad (6)$$

$$TiO_2 + C \rightarrow Ti + 2CO \qquad (7)$$

Figure 3:
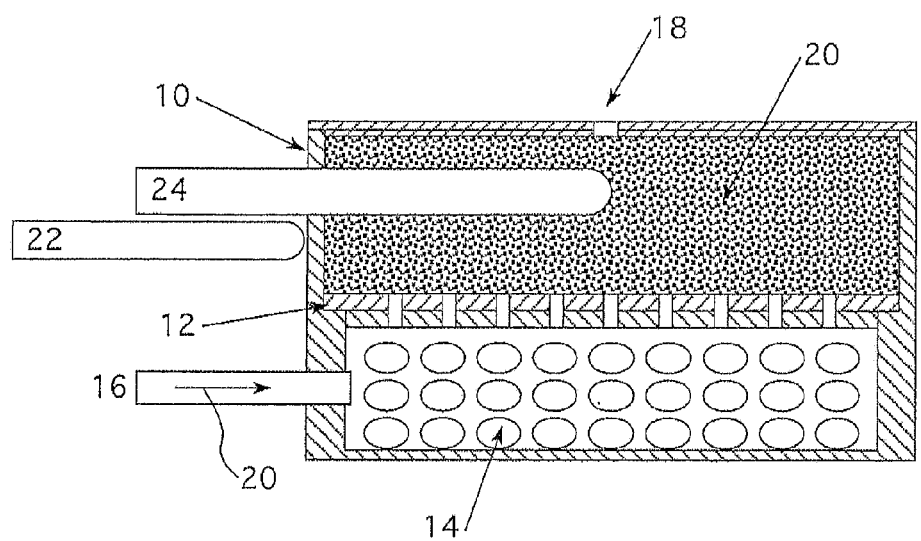
FIG. 3 is a diagram of an embodiment of a reactor which can be used in accordance with the embodiments of the instant disclosure.

Referring to FIG. 3, an embodiment of a reactor 10 which may be used in the producing step is depicted. In some embodiments, the reactor 10 is a graphite reactor vessel. In some embodiments, the reactor 10 may have more than one chamber, for example, an upper chamber 28 and a lower chamber 26, where the chambers are separated by a perforated separator plate 12. For example, the lower chamber may have non-reactive media 14 which may assist in heating an inert gas and/or dispersing heat through the perforated separator plate 12 into the upper chamber. For example, the media may include dispersing balls (i.e. alumina balls, e.g. ~5 mm). In some embodiments, the inert gas (depicted as arrow 20 entering the lower chamber) is fed through an inlet 14 in the lower chamber 26, filters through the perforated separator plate 12, and exits the reactor 10 through an vent 18 located in the upper chamber. In some embodiments, the precursor mixture 26 is placed into the upper chamber 28, so that the heat and inert gas will react the precursor mixture 26 into the titanium diboride product. In some embodiments, the reactor 10 (and/or the reaction process) is monitored with thermocouples, for example, an internal thermal couple 24 and/or an external thermocouple 22. In some embodiments, additional monitoring equipment and/or thermocouples may be placed throughout the reactor 10.

EXAMPLES

Example 1: Synthesis of TiB₂

For the precursor, boron oxide (Alfa Aesar, Ward Hill, Mass.), titanium dioxide (Kerr-McGee, Oklahoma City, Okla.) and Raven 410 carbon black (Columbian Chemicals, Marietta, Ga.) with iron oxide as a catalyst 0.25 wt. % (Elementis Pigments, Easton, Pa.) were chosen as the starting materials. In order to get submicron scale mixing and to overcome diffusion limits, the reagents were de-agglomerated and mixed with water as a dispersing medium in a 4 L vertical shaft attritor mill (Union Process, Akron, Ohio) with 5 mm diameter zirconia media for 15 minutes 1 mole TiO₂; 1.12 mole B₂O₃; and 5.12 moles of carbon and 3 moles of water, water promoted boric acid formation, which was removed upon heating. A surfactant, Tamol 731A (Rhom & Haas, Philadelphia, Pa.), was also added to maintain a low viscosity in the slurry. The heat from the hydration reaction with boron oxide and water was dissipated from the mill using non-contact cooling water.

The resulting slurry was spray dried (Niro, Columbia, Md.) to remove the un-bonded water. A free flowing spherical powder resulted. In order to keep the powder from fluidizing in the reactor, the powder was agglomerated into balls by mixing the powder and 18 weight % de-ionized water (as a binder) in an Eirich mixer (Eirich Machines, Chicago, Ill.) using a low agitator speed (770 RPM) and a low pan rotation speed (314 RPM) for a total of 15 minutes. The resulting 3-5 mm agglomerates were dried at 75° C. for 24 hours (in air). An agglomerated mixture of TiB₂-precursor resulted. Thermal gravimetric analysis (Netzsch, Burlington, Mass.) to 1739K in argon was performed on the TiB₂-precursor materials to estimate weight loss in the reactor.

A 50 mm diameter by 50 mm tall graphite crucible reactor was constructed and inserted into a tube furnace equipped with a 75 mm diameter alumina tube (see, e.g. FIG. 3). There was a perforated false bottom on the reactor to allow for argon to purge through the TiB₂ precursor. Argon was purged through at a rate of 0.5 L/min. The space below the perforated false bottom was filled with 5 mm alumina balls to assist in heating and dispersing the gas before it entered the reaction chamber. Thermocouples were placed in the center of the reaction bed and outside the reactor shell.

The reactor heated the TiB₂-precursor materials to react the precursor mixture. The temperature of the tube furnace was ramped slowly to accommodate the melting of the boric acid at 0.5° C./min until a temperature of 450° C. was reached. After a 30 minute soak (i.e. hold) at 450° C., the temperature was ramped at 5° C./min to 1500° C. This temperature was held for 120 minutes. A 1° C./min cool down rate was used until 750° C. to prevent thermal shock of the furnace equipment.

The reacted material cake was removed from the crucible and crushed into powder in a tungsten carbide grinding mill (Spex M8000, Metuchen, N.J.). The resulting product was confirmed to be TiB₂ through x-ray diffraction phase analysis (Phillips, The Netherlands).

Example 2: Effects of Sulfur in Carbon Source

The following experiment was performed to determine the effect of various carbon sources on the resultant titanium diboride powder properties. Table 1 lists the manufacturers, grades, and trace analysis of the carbon sources. In all instances, ICP (inductively coupled plasma) is used for trace analysis, except for sulfur, which uses a LECO's combustion method.

TABLE 1

Carbon Source and Trace Analysis

| Carbon Source | | Trace Analysis (%) | | | | | | | |
|---|---|---|---|---|---|---|---|---|---|
| Manufacturer | Grade | Al | Na | Si | Fe | Ca | Ni | Cr | S |
| Columbian Chemicals | Raven 410 Carbon Black | 0.01 | 0.02 | 0.02 | 0.02 | 0.02 | <0.005 | <0.005 | 1.3 |
| Asbury Carbon, Inc. | A99 Synthetic Graphite | 0.02 | <0.01 | 0.04 | 0.24 | 0.02 | <0.005 | <0.005 | 0.008 |
| Asbury Carbon, Inc. | 4023 Calcined Petroleum Coke | 0.006 | 0.02 | 0.02 | 0.19 | 0.03 | 0.05 | 0.02 | 1.2 |

Titanium diboride was synthesized in accordance with Example 1 using carbon sources depicted in Table 1. In this instance, the precursors may be mixed in a 100 mm diameter by 90 mm tall graphite crucible reactor inserted into an electrically heated tube furnace. The furnace may be fitted with a 150 mm diameter by 1200 mm alumina tube. The argon flow rate was set to 1 L/min. The reacted material may be removed from the crucible and milled lightly to break up the resultant powder cake using from about 4 to about 10 mm tungsten carbide balls and a tungsten carbide grinding mill (Spex M8000, Metuchen, N.J.). Each product was analyzed, including: SEM (Aspex Instruments, Delmont, Pa.), surface area (BET method, Horiba Instruments, Irvine, Calif.), and particle size analysis (Malvern Instruments, Southborough, Mass.). The resulting TiB$_2$ product was confirmed through x-ray diffraction for phase analysis.

The physical and chemical properties of the resulting titanium diboride powders utilizing three different carbon sources are provided below in Table 2, along with the resulting particle size distribution information and corresponding SEM micrographs. The PSD values reported in Table 2 may not reflect the actual particle size due to agglomeration.

TABLE 2

Carbon Sources and Resulting TiB$_2$ properties

Figure 4:
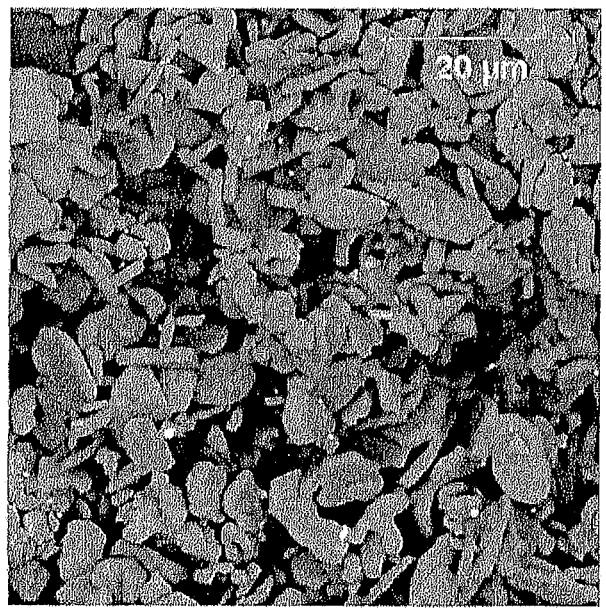
FIG. 4 is an SEM micrograph of the titanium diboride product that results when carbon black is used as the carbon source in accordance with the method depicted in FIG. 1.
Figure 5:
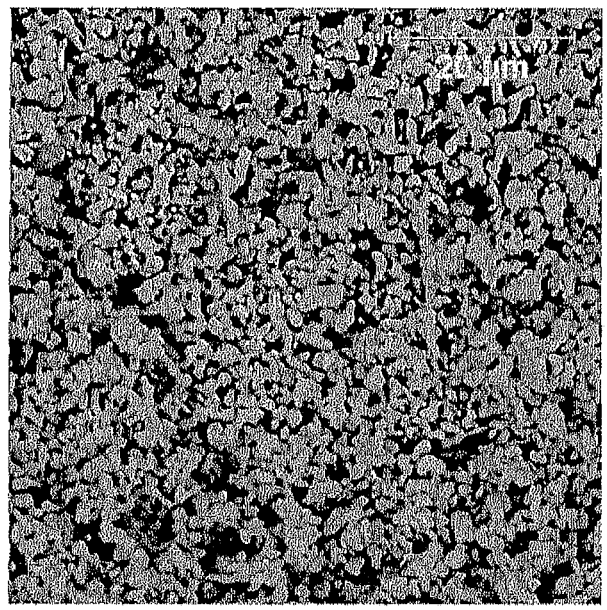
FIG. 5 is an SEM micrograph of the titanium diboride product that results when synthetic graphite is used as the carbon source in accordance with the method depicted in FIG. 1.
Figure 6:
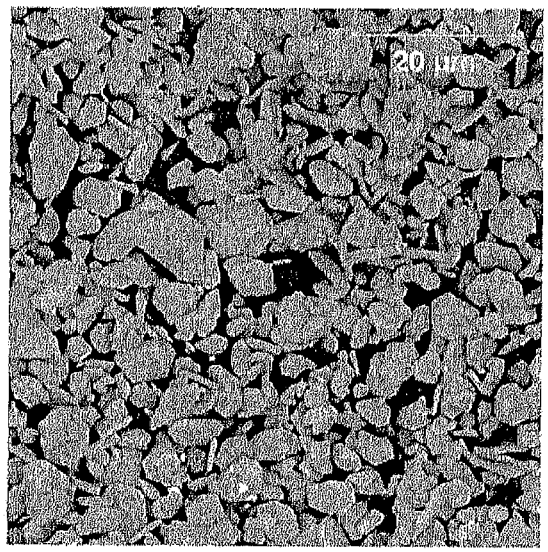
FIG. 6 is an SEM micrograph of the titanium diboride product that results when calcined petroleum coke is used as the carbon source in accordance with the method depicted in FIG. 1.

| Sample | Carbon source | Surface area (m$^2$/g) | PSD D10/D50/D90 (micron) | SEM micrograph |
|---|---|---|---|---|
| 1 | Raven 410 Carbon Black | 0.96 | 2.40/5.63/14.27 | FIG. 4 |
| 2 | Asbury A99 Synthetic Graphite | 1.27 | 1.82/6.38/18.92 | FIG. 5 |
| 3 | Asbury 4023 Calcined Petroleum Coke | 1.10 | 2.61/5.95/12.94 | FIG. 6 |

FIG. 4-6 are SEM micrographs of titanium diboride particles produced in accordance with the process flow described above using three different carbon source.

FIG. 4 is the SEM image of titanium diboride particles when carbon black Raven 410 (Columbian Chemicals, Marietta, Ga.) is used as a carbon source. In this example, the carbon black has an amount of sulfur of about 1.30%. Furthermore, the average particle size (PSD D50) of the actual titanium diboride particles is in the range of from about 5 microns to about 6 microns.

FIG. 5 is the SEM image of titanium diboride powders when synthetic graphite Asbury A99 (Asbury Carbon Inc., Asbury, N.J.) is used as a carbon source in accordance with the method depicted in FIG. 1. In this example, the synthetic graphite Asbury A99 has a sulfur level of not greater than about 0.008%. Furthermore, the average titanium diboride particle size is in the range of from about 1 micron to about 2 microns. This will become more apparent in subsequent figures and discussion.

FIG. 6 is the SEM image of titanium diboride powders when calcined petroleum coke Asbury 4023 (Asbury Carbon Inc., Asbury, N.J.) is used as a carbon source. In this example, the calcined petroleum coke Asbury 4023 has a sulfur level of about 1.20%. Furthermore, the average particle size (D50) of the titanium diboride particles is in the range of from about 5 microns to about 6 microns.

As may be seen from Table 2 and the SEM micrographs in FIGS. 4-6, particle morphology differences may be observed between titanium diboride powders made with synthetic graphite (FIG. 5) versus titanium diboride powders made with calcined petroleum coke (FIG. 6) or carbon black (FIG. 4). The synthetic graphite carbon source includes a plurality of bridged networks of fine titanium diboride particles (SEM analysis suggests that average crystallite sizes are on the order of from about 1 micron to about 2 microns). In contrast, carbon black and calcined petroleum coke carbon sources have similar plate-like geometries with similar D50 particle sizes of about 5.6 microns and about 5.9 microns, respectively. No agglomerations are apparent in the SEM micrographs for these samples.

X-ray diffraction (XRD) analysis of the titanium diboride product showed titanium diboride (TiB$_2$) as the major component with traces of titanium oxides (Ti$_x$O$_y$). In samples with synthetic graphite and calcined petroleum carbon as the carbon source, XRD showed titanium diboride as the major phase with traces of titanium borate (TiBO$_3$). In some instances, titanium borate may be an intermediate product that occurs in an incomplete carbothermic reduction process as depicted in Equations (1) and (2). In addition, carbon and oxygen analysis showed that all samples contained similar amounts of un-reacted material.

It was shown that titanium diboride particles produced with a low or no amount of sulfur (e.g., substantially sulfur-free) have smaller average particle sizes, although these titanium diboride products have some agglomeration present. Also, it is shown that titanium diboride particles produced with a higher amount of sulfur in the carbon source (e.g., carbon black, calcined petroleum coke) have larger titanium diboride particle sizes. Without being bound to a single mechanism or theory, one explanation is that a mineralization mechanism and/or vapor (or surface) diffusion occurs with the sulfur present in the carbon source.

Example 3: Effect of Sulfur on Powder Morphology

This Experiment was performed to evaluate the effect of sulfur on resulting titanium diboride powder morphology (e.g., grain size). In these instances, sulfur may be added in quantities equal to about 0.5%, or about 1.0%, or about 2.0%, or about 4.0%, as percentage of sulfur by weight to the carbon. Also there was a control sample having no addition of sulfur. Boric acid (US Borax, Boron, Calif.), titanium dioxide (Kerr-McGee, Oklahoma City, Okla.) and synthetic graphite (Asbury Carbons, Asbury, N.J.) with iron oxide as a catalyst (Elementis Pigments, Easton, Pa.) and the sulfur (Fisher Scientific, Pittsburgh, Pa.) were mixed using the above referenced method of Example 1. Compositions for this experiment are listed in Table 3. Argon was purged through the reactor at a rate of 1 L/min.

For sample 1, no additional sulfur additives were included with the precursor mixture. For samples 2-5, additional sulfur additives (e.g., precipitated sulfur) was added to the precursors in accordance with the percentages provided below in Table 3, along with the resulting particle size distribution information and corresponding SEM micrographs.

TABLE 3

Correlation of sulfur content and titanium diboride particle size.

Figures 7A, 7B, 7C, 7D, 7E:
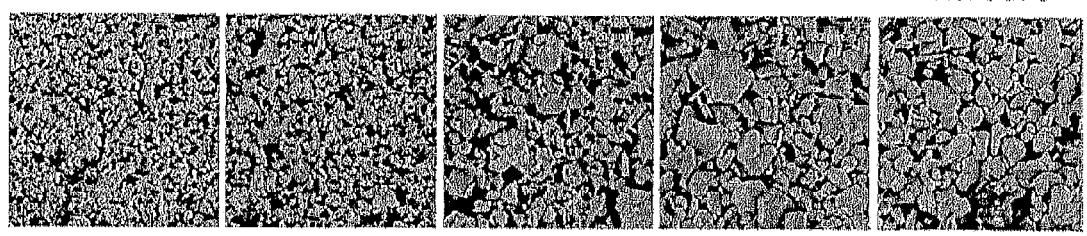
FIG. 7A-7E are SEM images (micrographs), which depict an increase in titanium diboride particle size as the amount of sulfur present in the precursor mixture increases (from 0% S to 4% S as measured in the carbon source of the precursor mixture).
Figures 8A, 8B, 8C, 8D, 8E:
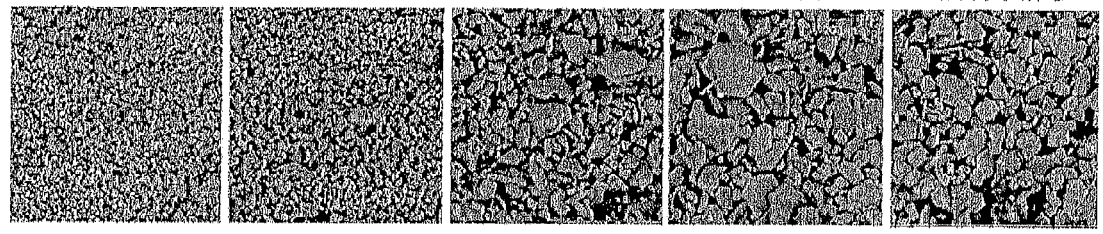
FIG. 8A-8E are SEM images (micrographs), which depict the samples of FIG. 7A through 7E, after undergoing a de-agglomerating step (i.e. milling). The milling time for these samples is in the range of from about 0.25 minute to 10 minutes.

| Sample | % Sulfur added to carbon | As-reacted PSD D10/D50/D90 (micron) | Deagglomerated PSD D10/D50/D90 (micron) | SEM micrograph |
| --- | --- | --- | --- | --- |
| 1 | 0.0 | 1.51/4.55/12.45 | 0.78/1.45/2.69 | FIG. 7A/FIG. 8A |
| 2 | 0.5 | 2.22/6.20/15.58 | 1.65/4.41/11.34 | FIG. 7B/FIG. 8B |
| 3 | 1.0 | 3.31/7.99/17.31 | 2.51/6.51/13.92 | FIG. 7C/FIG. 8C |
| 4 | 2.0 | 4.04/9.13/19.28 | 4.04/9.13/19.28 | FIG. 7D/FIG. 8D |
| 5 | 4.0 | 4.54/9.56/18.54 | 4.54/9.56/18.54 | FIG. 7E/FIG. 8E |

Based on the results in Table 3 and the SEM micrographs from FIG. 7A-7E, increasing sulfur content lead to an increase in titanium diboride particle size. For example, a sample with zero additional sulfur additive produced an as-reacted PSD D50 of about 4.55 microns and generally smaller-agglomerated grains (see FIG. 7A), while a sample with about 4.0% of sulfur additive produced an as-reacted PSD D50 of about 9.56 microns and generally larger grains (see FIG. 7E).

Examination of SEM micrographs from FIG. 7A-7E suggest that the particle size of the resulting titanium diboride powders increased in size as the level of sulfur increased. In another instance, in order to better correlate the increase in size to the level of sulfur added to the system, it may be necessary to accurately quantify the size of the titanium diboride particles (crystals).

The agglomerate networks present an issue for the particle size analyzer since the actual crystallites are bridged together and may be seen by the analyzer as a much larger particle. A milling/de-agglomeration step is used to break apart the bridged networks of particles. Unfortunately, this de-agglomeration step may begin to break the larger plate-like particles present in samples with higher sulfur levels, if the proper procedures are not used. Therefore, one prescribed mill time will not work for the entire set of samples. Milling/de-agglomeration procedures were developed to break apart the bridged networks of titanium diboride particles while maintaining particle size. In this instance, the time for milling/de-agglomerating the particles may vary.

The SEM micrographs from FIG. 8A-8E show corresponding titanium diboride powders after having been treated to a milling/de-agglomerating step. The additional grinding step may be necessary to ensure separation of hard agglomerates that may have formed during the synthesis process. The grinding step includes using a 100 mL tungsten carbide jar and 3 mm through hardened steel balls occupying about 50% of the volume of the jar. The mill contains about 6 grams of titanium diboride powder from the reactor and may be agitated for a period of about 0.25 minute, or about 0.5 minute, or about 2 minutes, or about 5 minutes, or about 7 minutes, or about 10 minutes using a Spex 8000M mill. SEM analysis may be used to confirm de-agglomeration and the presence of fractured particles by the milling action along with laser diffraction particle size analysis at each time interval. The milling time may be in the range of from about 0.25 minute to 10 minutes, or higher, depending on the particle size.

The SEM analysis of the titanium diboride powders from each milling interval shows that bridged networks of titanium diboride particles may be eliminated after 10 minutes for sample 1 with a measured D50 crystallite size of about 1.45 microns. Sample 2 may require up to 30 seconds in order to be free of agglomerates or bridged particles. Sample 3 displayed both isomorphic and plate-like particles, with milling time reduced to 15 seconds due to difficulty of de-agglomerating without fracturing larger platelets. Samples 4 and 5 exhibited no agglomeration after crushing reacted powder cakes, with the as reacted particle size being reported as the milled particle size of the powder as depicted in Table 3.

Figure 9:
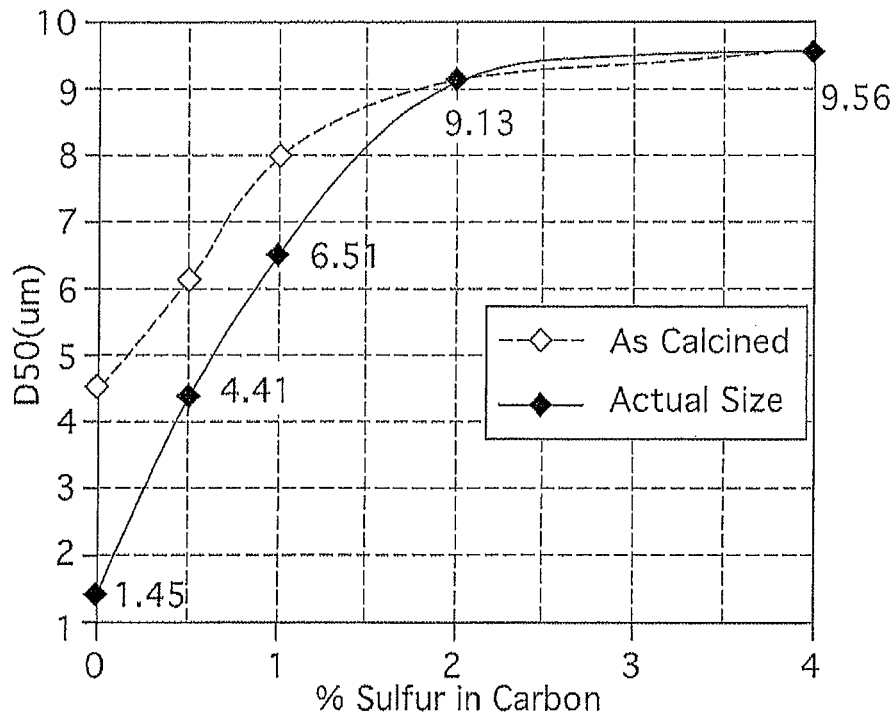
FIG. 9 is a chart depicting the D50 particle size distribution vs. the sulfur level added to the carbon source for "actual size" samples (e.g. after milling/de-agglomeration) and "as-calcined" samples (e.g. as reacted, possibly including agglomerations).

FIG. 9 is a graph of the D50 particle size versus sulfur level added to the carbon for as calcined samples and "actual size" samples, which have been subjected to a milling/deagglomerating step as discussed above. As shown, the graph depicts some difference between the measured agglomerated size and the measured "actual size" of the crystallites for samples containing relatively low sulfur levels (e.g., at about 0% sulfur, about 4.5 microns for as calcined versus about 1.45 microns for milled; at about 0.5% sulfur, about 6.2 microns for as calcined versus about 4.41 microns for milled; at about 1% sulfur, about 8 microns for as calcined versus about 6.51 microns for milled). For about 2% sulfur and about 4% sulfur, the D50 particle sizes are substantially similar for both calcined and milled at about 9.13 microns and about 9.56 microns, respectively.

Figure 12:
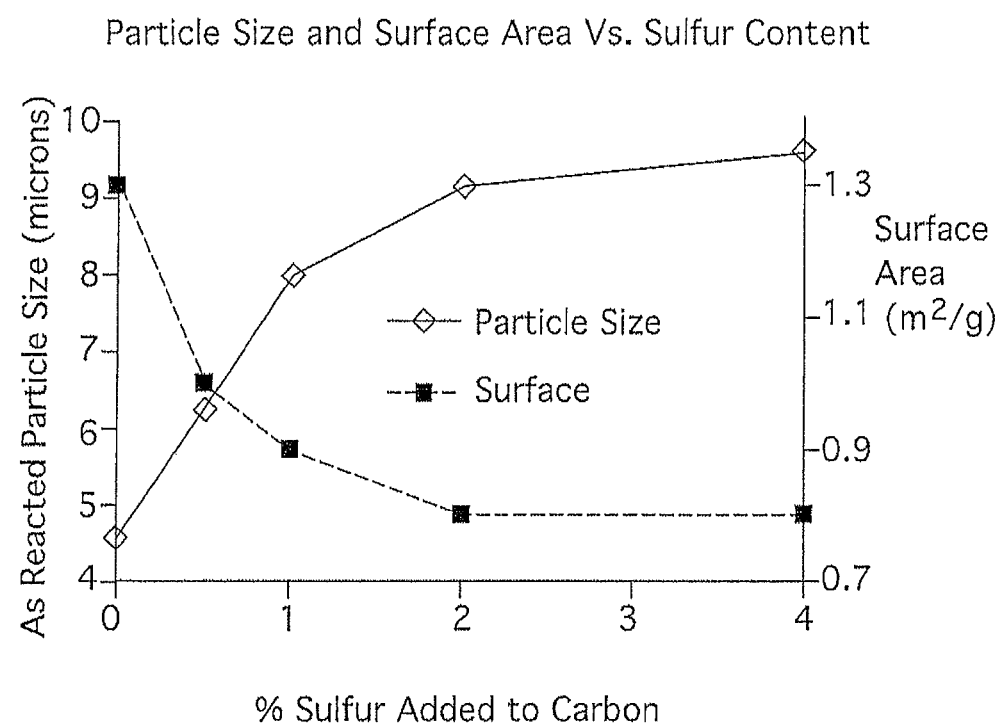
FIG. 12 is a chart which depicts the change in surface area and PSD D50 as the amount of sulfur present in the carbon source changes.

FIG. 12 is a chart which depicts the change in surface area and PSD D50 as the amount of sulfur present in the carbon source changes. As the surface area decreases from about 1.3 down to about 0.8, the D50 increases from about 4.5 to about 9.6 (micrometers). Without being bound to a single mechanism or theory, one possible explanation is that as the amount of sulfur increases from 0 to about 4%, the resulting surface area of the titanium diboride particles decreases because the size of the titanium diboride particles increases. This is supported by the increasing D50 values, which shows an increasing size average titanium diboride particle size as the sulfur increases.

Figure 13:
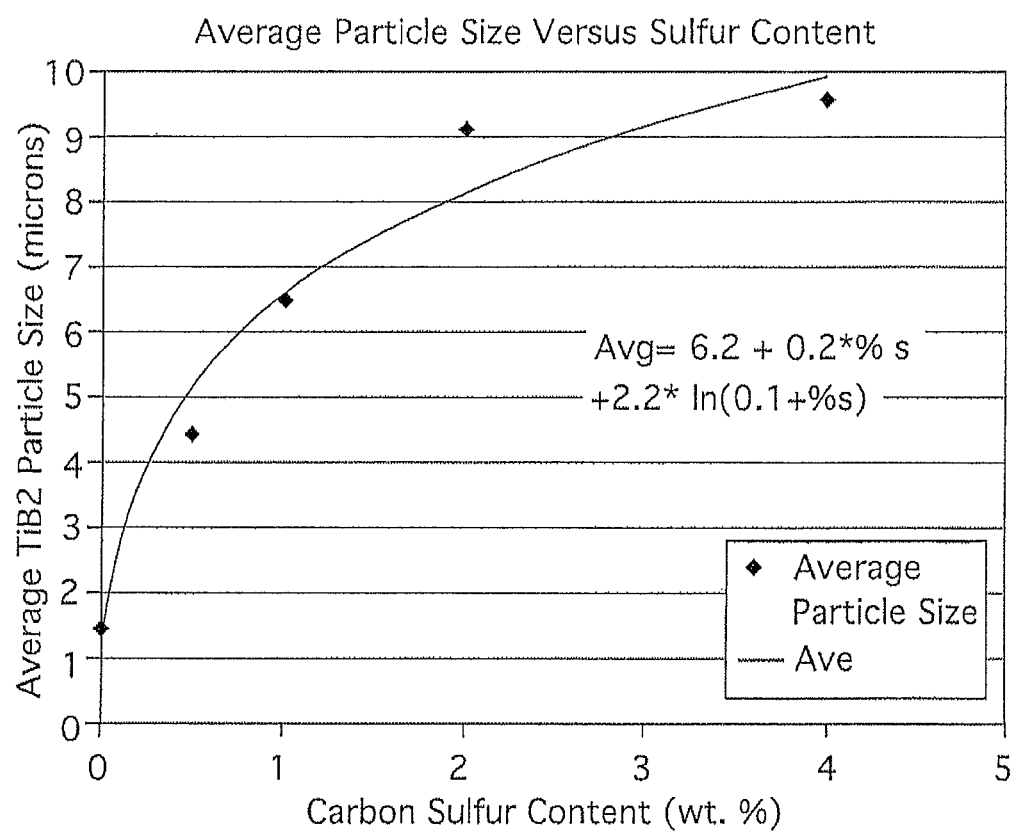
FIG. 13 is a chart which depicts the change in surface area and PSD D50 as the amount of sulfur present in the carbon source changes with a trend line.

FIG. 13 is a chart which depicts the change in surface area and PSD D50 as the amount of sulfur present in the carbon source changes with a trend line.

Example 4: Effect of Purge Rate

Figure 10:
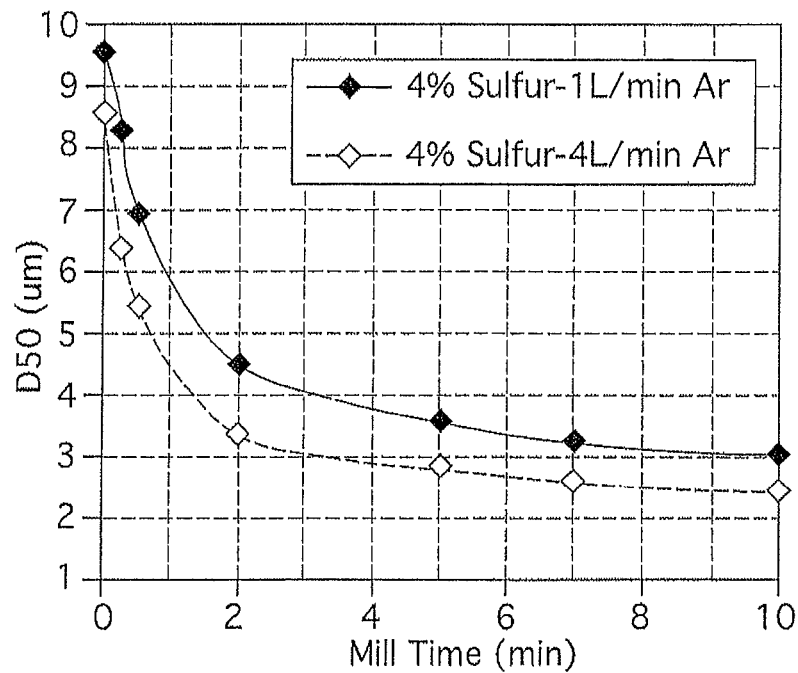
FIG. 10 is a chart depicting grinding curves of titanium diboride particles from titanium diboride product synthesized with carbon source containing about 4% sulfur at two different inert gas purge rates: 1 L/min and 4 L/min.

FIG. 10 is a graph showing grinding curves of titanium diboride particles synthesized using carbon containing about 4% sulfur reacted under argon purge rates of about 1 L/min and about 4 L/min. As shown, the measured as reacted D50 particle sizes may vary by nearly 1 micron between the two samples. As such, the size control of the sulfur additions may be affected by the argon purge rate of the reactor crucible. In some embodiments, there is much less of an effect of argon purge rate with sulfur-free systems. Without being bound to a particular mechanism or theory, these observations allude to one of the crystallite growth mechanism and its dependence of size on the partial pressures of gaseous species present during the reaction. In some instances, different inert gases (e.g., helium) at different purge rates may be supplied to the reactor to determine its effect on particle size and sulfur addition.

Figure 11A:
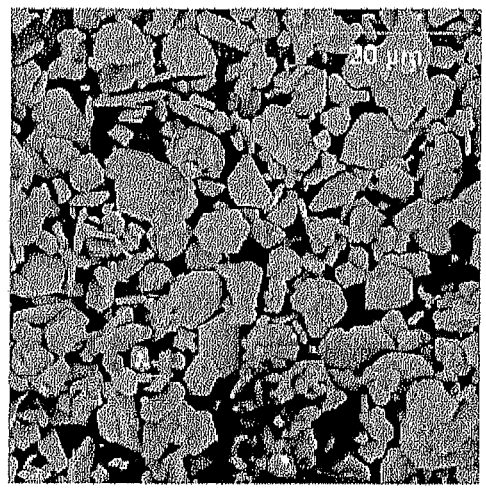
FIGS. 11A and 11B are SEM images of the titanium diboride products obtained at 1 L/min argon purge rate (FIG. 11A) and 4 L/min argon purge rate (FIG. 11B), depicting the different size and morphology of the resulting titanium diboride particles.
Figure 11B:
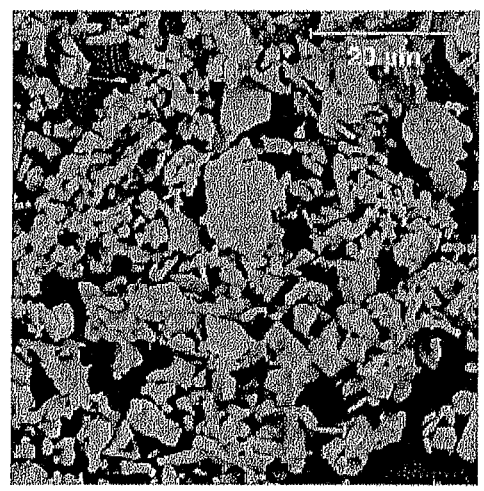

FIG. 11 shows the SEM images of the reacted titanium diboride powders from above having about 4% sulfur content at argon purge rates of about 1 L/min and about 4 L/min. From these images, finer particles may be observed in the sample prepared under a higher purge rate (e.g., about 4 L/min) and that agglomeration may be present. Based on grinding curves, actual crystallite size (e.g., milled size) may differ by up to about 4 microns depending on the amount of agglomeration present in the finer particles at the higher purge rate (e.g., about 4 L/min).

As in the sample synthesized with carbon containing about 1% sulfur, the higher purge rate (e.g., about 4 L/min) sample contained both isomorphic and plate-like crystallites. In this instance, it may be difficult to determine in the particle size analyzer which size reduction mechanism may be at play: de-agglomeration or crystallite fracture, as a sample is milled. Accordingly, the "true size" (e.g., milled) of the higher purge rate (e.g., about 4 L/min) sample is as suggested based on the SEM analysis, which is estimated to be closest to that of the about 15 seconds or about 30 seconds milling time interval. Deagglomeration of the final product was performed as in Example 3.

Example 5: Effects of Soak Time and Reaction Temperature

This Experiment was performed in order evaluate the soak time of the precursor mixture and the temperature of reaction. Titanium diboride was synthesized in accordance with Example 1, where the carbon was Asbury A99 graphite (sulfur free). Table 4 below provides the soak time (hrs.) and temperature (C) of each run, along with the compositional analysis of each $TiB_2$ product that resulted, including surface area, impurities (e.g. N, O, C) and particle size distribution (PSD). A reactor size of Example 2 was used, with an argon purge rate of 1 L/min.

TABLE 4

$TiB_2$ Product Analysis by Soak Time and Temperature

| Sample ID | Soak Time (hrs) | Temp. (° C.) | Surface Area (m²/g) | PSD D10 (µm) | PSD D50 (µm) | PSD D90 (µm) |
|---|---|---|---|---|---|---|
| 1 | 0.5 | 1475 | 1.54 | 1.44 | 4.76 | 14.41 |
| 2 | 1 | 1475 | 1.63 | 1.66 | 5.18 | 14.53 |
| 3 | 2 | 1475 | 1.47 | 1.64 | 5.83 | 20.92 |
| 4 | 4 | 1475 | 1.34 | 1.71 | 6.59 | 21.32 |
| 5 | 0.5 | 1500 | 1.54 | 1.48 | 4.97 | 15.36 |
| 6 | 1 | 1500 | 1.35 | 1.43 | 5.63 | 17.13 |
| 7 | 2 | 1500 | 1.27 | 1.65 | 6.17 | 18.30 |
| 8 | 4 | 1500 | 1.29 | 1.73 | 6.59 | 19.93 |
| 9 | 0.5 | 1600 | 1.1 | 2.00 | 7.24 | 20.45 |
| 10 | 1 | 1600 | 1.0 | 2.21 | 8.04 | 22.52 |
| 11 | 2 | 1600 | 0.8 | 2.50 | 8.88 | 25.16 |
| 12 | 4 | 1600 | 0.8 | 2.58 | 9.67 | 26.55 |

Figure 14:
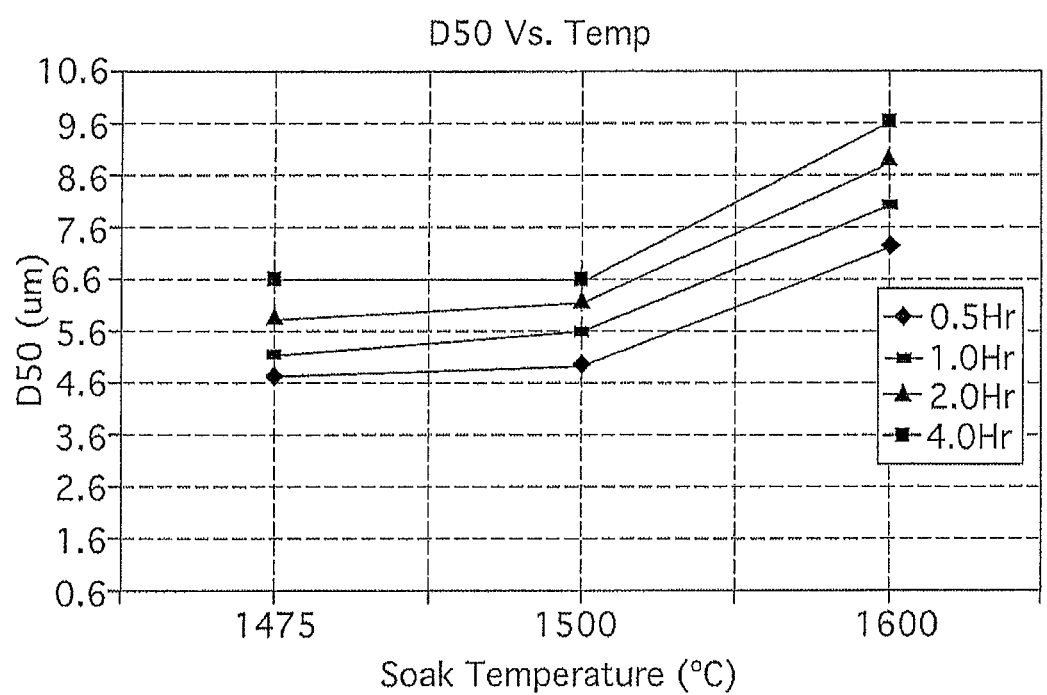
FIG. 14 is a chart depicting the PSD D50 as temperature (reaction temperature) increases (plotted for four different soak times).

FIG. 14 is a chart depicting the PSD D50 as temperature (reaction temperature) increases (plotted for four different soak times).

Figure 15:
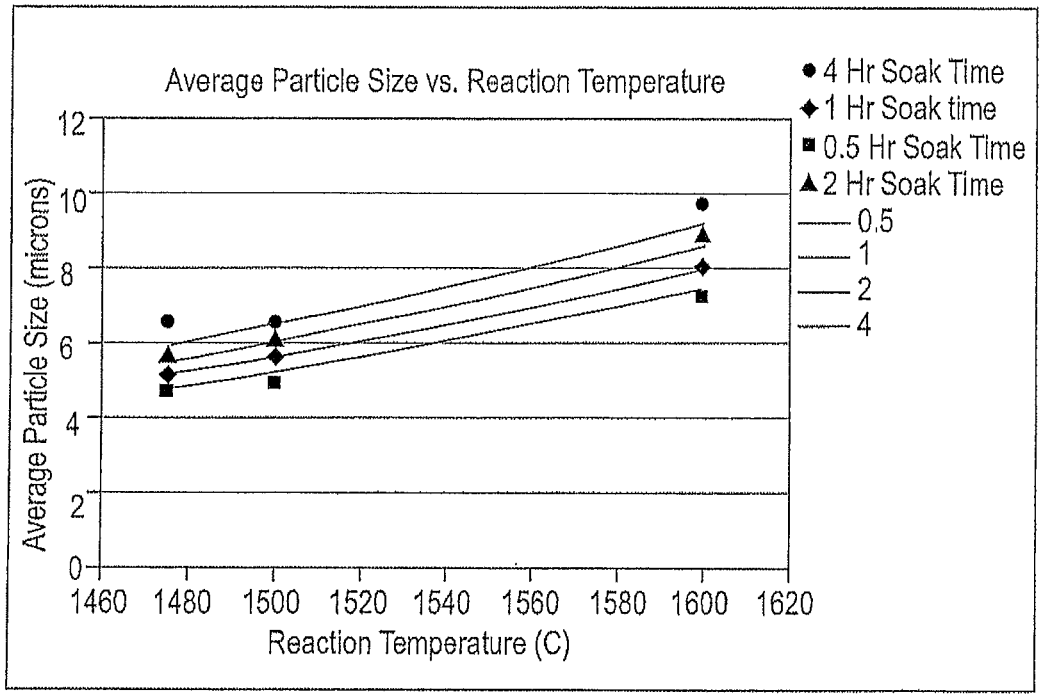
FIG. 15 is a chart depicting the PSD D50 as temperature (reaction temperature) increases (plotted for four different soak times), with trend lines added to each of the lines.

FIG. 15 is a chart depicting the PSD D50 as temperature (reaction temperature) increases (plotted for four different soak times), with trend lines added to each of the lines.

Figure 16:
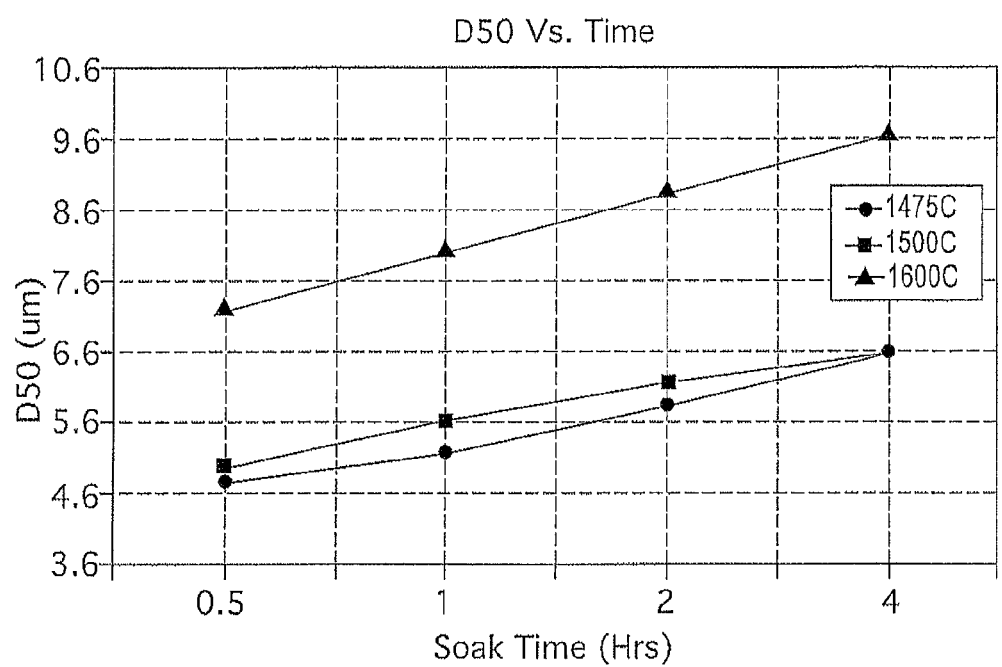
FIG. 16 is a chart depicting the change in average particle size distribution as soak time increases (plotted for three reaction temperatures).

FIG. 16 is a chart depicting the change in average particle size distribution as soak time increases (plotted for three reaction temperatures).

Figure 17:
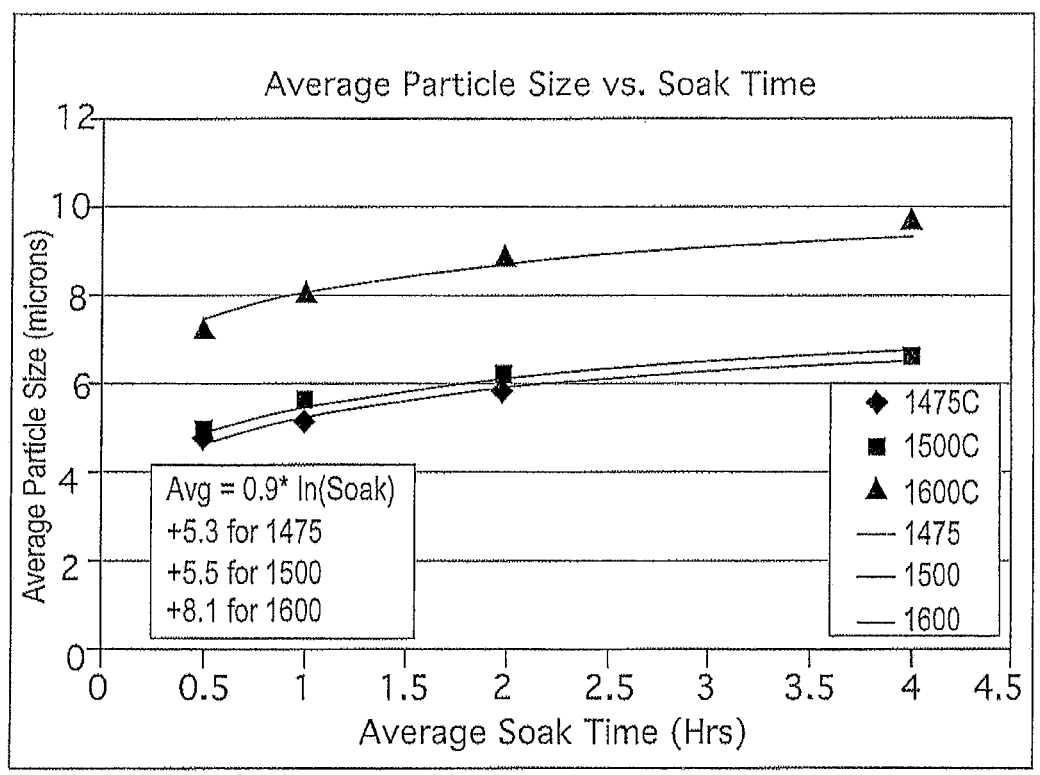
FIG. 17 is a chart depicting the change in average particle size distribution as soak time increases (plotted for three reaction temperatures) with trend lines added.

FIG. 17 is a chart depicting the change in average particle size distribution as soak time increases (plotted for three reaction temperatures) with trend lines added.

Figure 18:
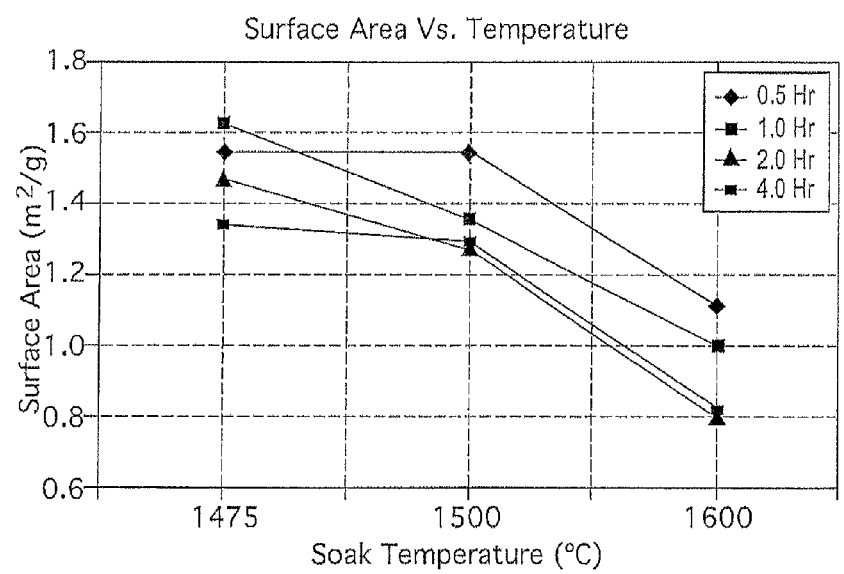
FIG. 18 is chart depicting the surface area vs. temperature for four different soak times.

FIG. 18 is chart depicting the surface area vs. temperature for four different soak times.

Figure 19:
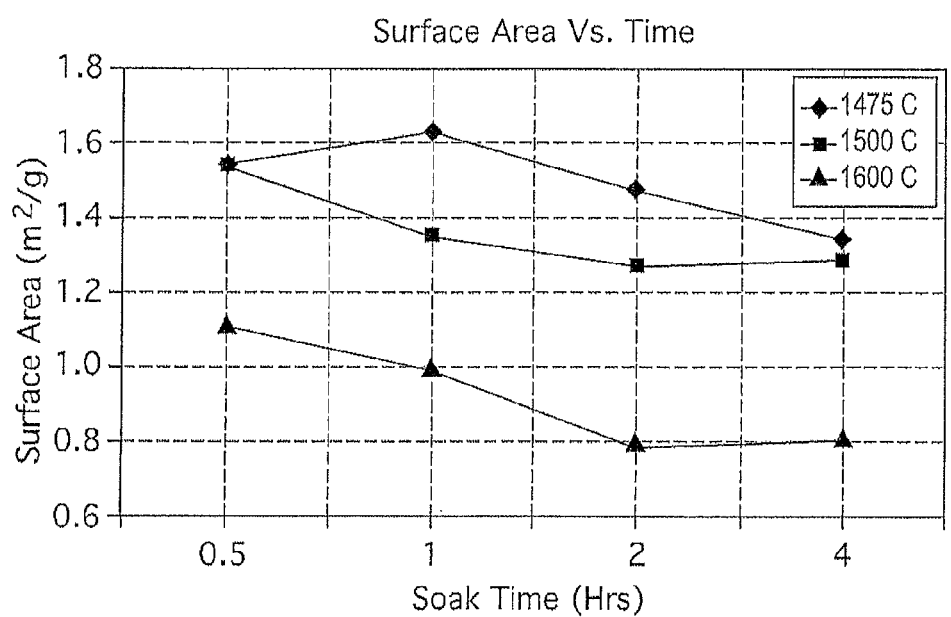
FIG. 19 is a chart depicting the surface area vs. soak time for three different temperatures.
Figure 20A:
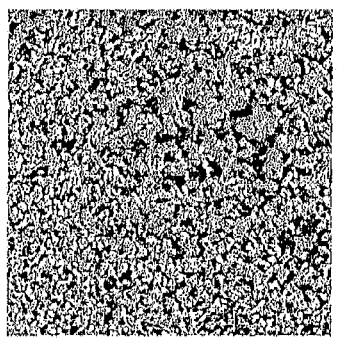
FIG. 20A-F are SEM micrographs depicting the particle sizes of the titanium diboride product obtained from reactions completed with two soak times (0.5 hr and 4 hrs) at three different soak temperatures (1475° C., 1500° C., and 1600° C.).
Figure 20B:
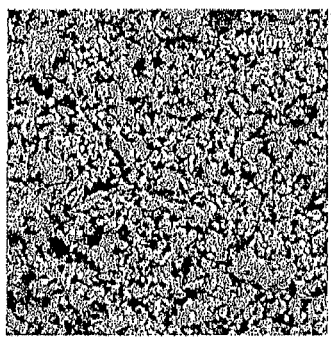
Figure 20C:
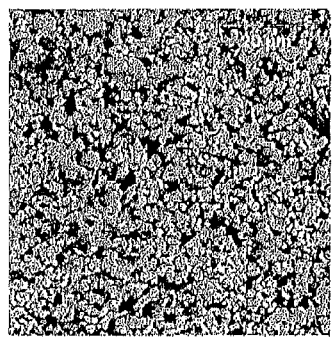
Figure 20D:
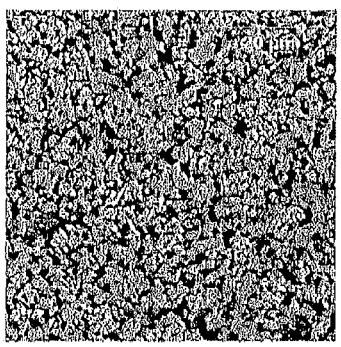
Figure 20E:
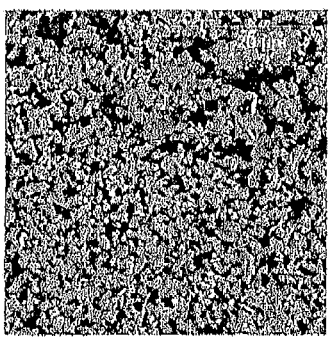
Figure 20F:
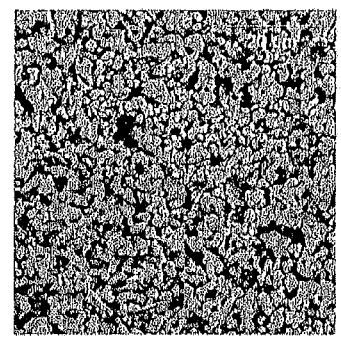

FIG. 19 is a chart depicting the surface area vs, soak time for three different temperatures.

FIG. 20A-F are SEM micrographs depicting the particle sizes of the titanium diboride product obtained from reactions completed with two soak times (0.5 hr and 4 hrs) at three different soak temperatures (1475° C., 1500° C., and 1600° C.).

Example 6: Effect of Inert Gas Purge Rate on Precursor Mixture (Without Sulfur)

The following Experiment was performed in accordance with Example 1, with a soak time of 2 hours and at a temperature of 1500° C. at different inert gas purge rates for each run to evaluate the effect of the inert gas purge rate through the reactor when no sulfur is included with the precursor mixture. For this set of Experiments, the carbon source was synthetic graphite (Asbury 99). No deagglomeration step was performed, the cake was broken up as in Example 1.

TABLE 5

$TiB_2$ Product Analysis by Argon Flow Rate.

| Sample ID | Gas Flow Rate (l/min) | Surface Area (m²/g) | D10 (um) | D50 (um) | D90 (um) |
|---|---|---|---|---|---|
| 1 | 0.25 | 1.2 | 1.88 | 6.45 | 18.67 |
| 2 | 0.50 | 1.27 | 1.82 | 6.38 | 18.92 |
| 3 | 1.00 | 1.23 | 1.85 | 6.69 | 19.89 |
| 4 | 2.00 | 1.25 | 1.80 | 5.85 | 17.18 |
| 5 | 3.00 | 1.3 | 1.82 | 6.16 | 18.60 |

Figure 21A:
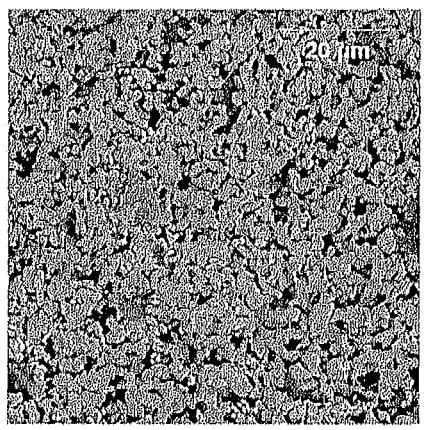
FIG. 21A-21D are SEM micrographs that depict the particle size of the titanium diboride product obtained at two different argon flow rates and with different carbon sources.
Figure 21B:
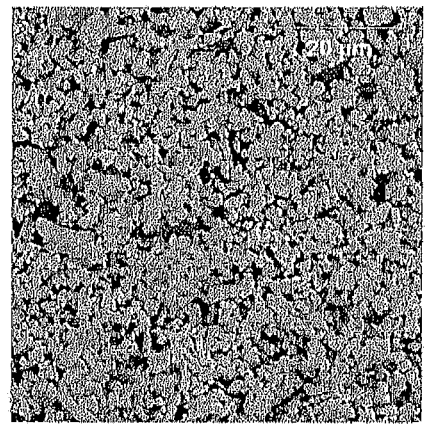
Figure 21C:
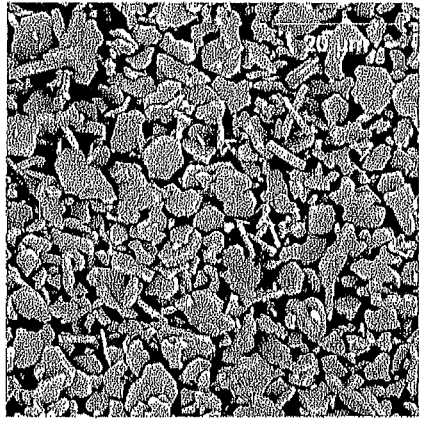
Figure 21D:
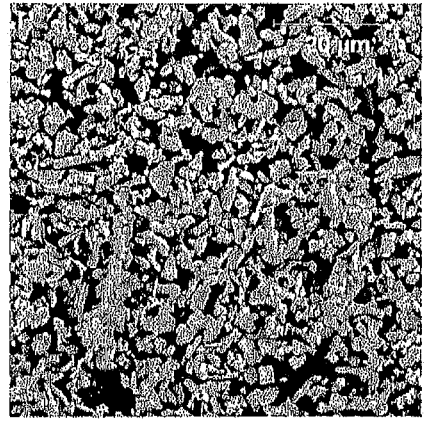

FIG. 21A-21D are SEM micrographs that depict the particle size of the titanium diboride product obtained at two different argon flow rates and with different carbon sources. FIG. 21A depicts a 0.25 L/min flow rate with low to no sulfur present in the carbon source (i.e. synthetic graphite). FIG. 21B depicts a 3.0 L/min flow rate with no to low sulfur present in the carbon source (i.e. synthetic graphite). FIG. 21C depicts a 0.25 L/min flow rate with sulfur present in the carbon source (i.e. carbon black). FIG. 21D depicts a 3.0 L/min flow rate with sulfur present in the carbon source (i.e. carbon black).

What is claimed is:
1. A method of making a titanium diboride product having a target average particle size, comprising the following steps:
   i) providing a precursor mixture comprising a titanium source, a boron source, a carbon source and an amount of sulfur;
   ii) controlling the amount of sulfur in the precursor mixture, wherein the amount of sulfur is based on the target average particle size;

iii) reacting the precursor mixture in a reactor to form an actual titanium diboride product having an actual average particle size;
iv) deagglomerating the actual titanium diboride product to remove a plurality of agglomerations in the titanium diboride product,
wherein, due to the amount of sulfur, the actual average particle size corresponds to the target average particle size;
wherein the average particle size is of the titanium diboride product measured by a particle size distribution of the titanium diboride product,
wherein the particle size distribution of the titanium diboride product is between a D50 value of 1.45 µm and a D50 value of 9.56 µm,
wherein the D50 value of 1.45 µm means that 50% of the particles are smaller than 1.45 µm while the other 50% of the particles are equal to or greater than 1.45 µm,
wherein the D50 value of 9.56 µm means that 50% of the particles are smaller than 9.56 µm while the other 50% of the particles are equal to or greater than 9.56 µm,
wherein the relationship between the D50 value of the particle size distribution of the average particle size of the titanium diboride product and the amount of sulfur follows the following equation:

$$Avg=6.2+0.2\times\% \ S+2.2\times\ln(0.1+\% \ S),$$

wherein:
Avg=the D50 value of the particle size distribution of the average particle size of the titanium diboride product, and
% S=weight percent of sulfur, and
wherein the amount of sulfur refers to the weight percent present as the precursor mixture, wherein the amount of sulfur is greater than 0.0 and less than 4.0% by weight.

2. The method of claim 1, wherein the sulfur-containing compound additives are metal sulfides and metal sulfates.

3. The method of claim 1, wherein the reacting step comprises carbothermically reacting the precursor mixture.

4. The method of claim 1, wherein a condition of an at least one processing variable is based on the target average particle size and/or the amount of sulfur.

5. The method of claim 1, wherein reacting the precursor mixture further comprises controlling at least one processing variable from a group, comprising a soak time, a reaction temperature and an inert gas flow rate.

6. The method of claim 1, wherein the method further comprises the step of producing the precursor mixture, wherein producing the precursor mixture comprises the following steps:
mixing into a liquid to form a suspension:
a boron source;
a carbon source;
a titanium source; and
drying the suspension to produce the precursor mixture having a plurality of agglomerations.

7. The method of claim 1, wherein the step of deagglomerating includes milling of the titanium diboride product.

8. The method of claim 1, further comprising the step of processing the actual titanium diboride product into one of: a cathode; and a structure of an aluminum electrolysis cell.

9. A method comprising:
i) providing a precursor mixture comprising a titanium source, a boron source, a carbon source and an amount of sulfur, wherein the amount of sulfur is no greater than 1% by weight of sulfur present in the precursor mixture;
ii) reacting the precursor mixture in a reactor to form a titanium diboride product having an average particle size of no greater than 7 µm;
wherein the average particle size of the titanium diboride product is controlled by selecting the amount of sulfur present in the precursor mixture,
wherein the average particle size of the titanium diboride product is smaller with a low amount of sulfur and larger with a higher amount of sulfur.

10. The method of claim 9, wherein the reacting step comprises carbothermically reacting the precursor mixture.

11. The method of claim 9, wherein the condition of the at least one processing variable is based on the target average particle size and/or the amount of sulfur.

12. The method of claim 9, wherein the method further comprises the step of producing the precursor mixture, wherein producing the precursor mixture comprises the following steps:
mixing into a liquid to form a suspension:
a boron source;
a carbon source;
a titanium source; and
drying the suspension to produce the precursor mixture having a plurality of agglomerations.

13. The method of claim 9, wherein the method includes a step of deagglomerating the actual titanium diboride product to remove a plurality of agglomerations in the titanium diboride product.

14. The method of claim 13, wherein the step of deagglomerating includes milling of the titanium diboride product.

15. The method of claim 9, further comprising the step of processing the actual titanium diboride product into one of: a cathode; and a structure of an aluminum electrolysis cell.

16. The method of claim 5, wherein the reaction temperature is at least about 1300° C.; wherein the soak time is at least about 0.5 h; wherein the inert gas flow rate is in the range of at least about 0.5 liters per minute.

17. The method of claim 6, wherein the drying step comprises spray drying.

18. The method of claim 12, wherein the drying step comprises spray drying.

* * * * *